United States Patent Office 2,911,991
Patented Nov. 10, 1959

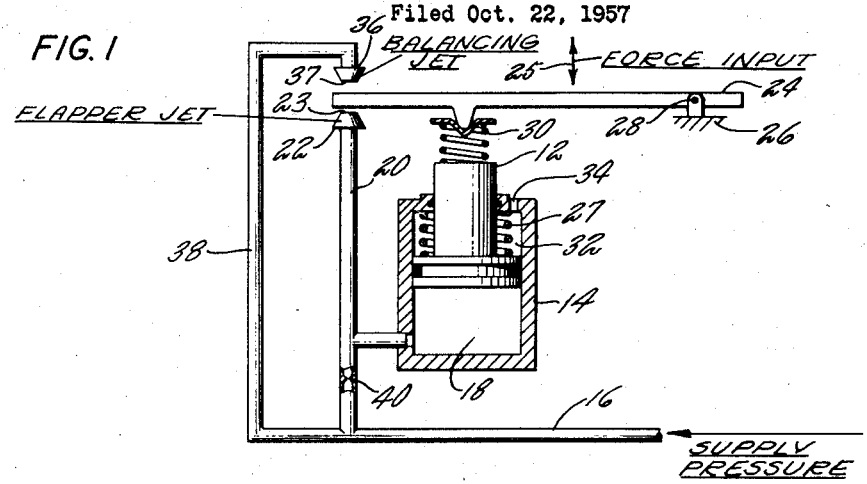

2,911,991

BALANCED SERVO ACTUATING MEANS

David R. Pearl, West Hartford, Conn., assignor to United Aircraft Corporation, East Hartford, Conn., a corporation of Delaware Application October 22, 1957, Serial No. 691,688

8 Claims. (Cl. 137—85)

This invention relates to force balance and more particularly to the use of impulse force to counterbalance or compensate for both impulse and pressure forces.

It is an object of this invention to use impulse forces to counterbalance or compensate for varying steady state orifice forces which vary with changes in the force creating characteristics of the system fluid.

It is an object of this invention to use impulse forces to counterbalance or compensate for varying steady state orifice forces which vary because of supply pressure changes.

It is a further object of this invention to use impulse forces to counterbalance or compensate for varying steady state orifice forces which vary because of fluid density changes caused, for example, by temperature variations.

It is still a further object of this invention to teach a counterbalancing device that is essentially frictionless and has ultimate simplicity.

It is still a further object of this invention to provide actuating means or servo positioning means which comprises a flapper jet impinging upon a movable flapper beam such that, during steady state flow operations through the flapper jet forming orifice, the pressure in the orifice line varies with the relative position between the flapper jet orifice and the flapper beam to create a varying actuating force. This invention includes the improvement of a balancing jet directing fluid against the flapper beam to create impulse forces thereagainst and thereby create a torque balance with the torque created by the flapper jet and compensate for the changes in impulse and pressure forces acting on the movable member due to flapper jet impingement which changes are the result of force creating fluid characteristics changes in the flapper jet fluid which would normally cause movement of the flapper beam and hence introduce an undesired variation in the actuating force.

It is a further object of this invention to provide servo means whose actuation is unaffected by variations in the force generating characteristics of the servo actuating fluid such as a change in density, possibly due to temperature change, and a change in the supply pressure of the servo actuating fluid.

Other objects and advantages will be apparent from the specification and claims, and from the accompanying drawings which illustrate an embodiment of the invention.

Fig. 1 is a schematic representation of servo mechanism utilizing this invention.

Fig. 2 is a schematic representation of a servo mechanism of the half-area type which utilizes this invention.

Fig. 3 is a fragmentary schematic representation of a portion of a servo mechanism of the type shown in Figs. 1 and 2 which substitute a Bourdon-type tube or other fluid static pressure responsive force generating device for the balancing jet.

Fig. 4 is an enlarged and fragmentary representation of the balancing jet and flapper beam contouring causing the balancing jet stream to change direction to effect maximum balancing jet imposed impulse force against flapper beam.

While this invention will be described in part with respect to its applicability to a modern aircraft fuel control of the type disclosed and fully described in United States patent application Serial Number 528,879 entitled "Fuel Control" which was filed on August 17, 1955 in the name of Thomas P. Farkas, it should be borne in mind that the invention is by no means so limited and that this application is chosen purely for the purpose of illustration.

Referring to Fig. 1, we see a servo mechanism utilizing this invention and comprising a servo piston 12 movable within cylinder type housing 14 and which may, for example, be used to position one of the elements of the fuel control throttle valve of the type taught in the above-identified United States patent application Serial Number 528,879. Actuating fluid which may be, for example, fuel, air, oil or the like, is admitted to the system at line 16, probably from a pump (not shown). Actuating fluid passes into piston actuating or force generator chamber 18 and also passes through line 20 to flapper jet 22. A jet or stream of actuating fluid is discharged through orifice 23 of flapper jet 22 continuously and is directed to impinge against flapper beam or movable member 24 which is pivotally attached to any convenient structure 26 and pivots about pivot point 28. Feedback spring 30 is compressed between servo piston 12 and flapper beam 24 and serves, together with the input or actuating force 25 which is controlled, possibly by an operator, to move flapper beam 24 as desired, together with any resistance means such as spring 27 available in chamber 32 to counterbalance the servo piston actuating force existing in chamber 18. It will be noted that chamber or cavity 32 is in communication with atmosphere through bleed 34.

As the jet of actuating fluid is caused to impinge against flapper beam 24 by flapper jet 22, both a flow, momentum, or impulse force $$\frac{(mv_2 - mv_1)}{t}$$

and a pressure force equal to the area of the jet or stream multiplied by the pressure of the actuating fluid being directed from flapper beam 24 ($Ap$), is imposed on flapper beam 24. As flapper beam 24 is caused to move toward flapper jet 22 by the controlled input or actuating force 25 acting thereon, the restriction of flapper jet 22 outlet resulting will cause a pressure increase in the actuating fluid in line 20 and hence in cavity 18 to cause servo piston 12 to move upwardly against the urgings of feedback spring 30 and spring 27 until feedback spring 30 is compressed sufficiently to return flapper beam 24 to a balanced position whereupon servo piston 22 is in equilibrium at a new position as the steady state fluid flow condition through flapper valve 22 continues. In like fashion if the input force 25 causes flapper valve 24 to move away from flapper jet 22, the pressure within line 20 and servo piston actuating chamber 18 would decrease and permit feedback spring 30 and spring 27 to move servo piston 12 downwardly until a pressure is established in chamber 18 to balance the combined force of feedback spring 30, spring 27 and the input force 25 so that the system is against an equilibrium and piston 12 is in a new position. In view of this, it will be obvious that servo piston 12 is made to reposition itself in accordance with the dictates or magnitude and direction of an input force 25 acting against flapper beam 24, which input force changes the relative position between flapper beam 24 and flapper jet 22 and hence varies the servo piston actuating force.

As the force creating characteristics of the actuating fluid in our system change, for instance as the pressure of the actuating fluid being supplied to line 16 varies, possibly due to pump output variations, or as the actuating fluid density varies, possibly due to temperature variation, these force creating actuating fluid characteristics variations will cause variations in the steady state orifice forces in flapper jet 22 which will vary the total force (impulse plus pressure) acting upon flapper beam 24 as a result of the impingement of flapper jet 22 thereagainst. This change in force acting against flapper beam 24 will cause a change in position of beam 24 and a corresponding change in position of servo piston 12. This is highly undesirable since it is important to our servo mechanism that servo piston 12 move only in response to input force 25 variations acting against the moving flapper beam 24. In short, it is desired to have servo piston 12 move in response to input force 25 variations acting on flapper beam 24 solely, and it is considered undesirable to have servo piston 12 move in response to the force creating fluid characteristics changes just described since, for example, other mechanism may be included in a fuel control to compensate for these variations and, further, the movement to servo piston 12 caused by these aforementioned variations may not be in the direction of correction.

To compensate for the force changes on flapper beam 24 caused by the above described force creating actuating fluid characteristics changes, balancing jet 36 is provided and is positioned, as shown in Fig. 1, to continuously direct a jet or stream of actuating fluid through orifice 37 against flapper beam 24 in a direction opposite to the jet or stream directed thereagainst by flapper nozzle 24. Balancing jet 36 is connected to supply line 16 through line 38 and is preferably positioned a sufficient distance from flapper beam 24 that impulse forces solely are the main forces imparted to flapper beam 24 by balancing jet 36. These impulse forces vary with variations in the above described force creating actuating fluid characteristics equally with the forces applied beam 24 by flapper jet 22 so that a counterbalancing impulse force is generated against flapper beam 24 by balancing jet 36 to compensate for steady state orifice forces impose thereagainst by flapper jet 22. In this fashion, all forces tending to move flapper beam 24 as a result of variations in force creating actuating fluid characteristics will be canceled so that servo piston 12 will be moved only as a result of variations of the input force 25 to flapper beam 24.

It will be obvious to those skilled in the art that by properly selecting the orifice areas 23 and 37 of flapper jet 22 and balancing jet 36, and regulating the pressure thereto possibly by use of a restriction such as 40 in line 20 and by varying the distance of flapper jet 22 and balancing jet 36 from flapper beam 24, and further by varying the distances of and direction (moment wise) jets 22 and 36 from pivot point 28 the impulse forces directed against flapper beam 24 by balancing jet 36 may be made to counteract and counterbalance both the impulse and pressure forces, known as steady state orifice force directed thereagainst by flapper jet 22, regardless of the flow conditions. In short, the jets 22 and 36 are designed to impart counterbalancing movement provoking torques to movable member 24.

To further increase the total impulse force imparted to flapper beam 24 by balancing jet 36 a recessed area 42 (Fig. 4) may be fabricated into flapper beam 24 to receive the jet or stream of actuating fluid direct from balancing jet 36 and cause same to change its flow direction any desired amount and as much as 180°, thereby increasing the impulse force acting on beam 24 and caused by balancing jet 36.

Fig. 2 is another potential embodiment of a servo mechanism utilizing this invention and differs from Fig. 1 in that it utilizes a so-called half-area servo piston. Again, pressurized fluid is supplied through line 16' and may pass to flapper jet 22' through line 20' after passing through orifice 40' and also enters actuating chamber 18'. Supply fluid is also directed through line 42 to chamber 32' and servo piston 12' is held in equilibrium by the actuating fluid pressure in chamber 32' plus the feedback spring 30' pressure which is opposed by actuating pressure in chamber 18' which after passing through orifice 40' is substantially half the pressure in chamber 32'. Actuating fluid is also supplied to balancing jet 36' through 38' and acts in the same fashion as described in connection with Fig. 1 to counterbalance the changes in steady state orifice forces imposed against flapper beam 24' by flapper jet 22' by utilizing equal changes in impulse forces imparted to move member 24' by the balancing jet 36'.

A potential variation of this invention is shown in Fig. 3 in which the changes in steady state orifice forces directed against flapper 24'' by flapper jet 22'' are counterbalanced by Bourdon-type tube unit 44 or other fluid static pressure responsive force generating device which receives actuating fluid through line 38'' and imparts a counteracting force to flapper beam 24''.

It is to be understood that the invention is not limited to the specific embodiment herein illustrated and described but may be used in other ways without departure from its spirit as defined by the following claims.

I claim:

1. Servo positioning means comprising a variable area servo chamber defined by a stationary member and a first movable member, means continually supplying pressurized servo fluid into said chamber, a second movable member, means connecting said movable members and imparting a positioning force to each so that a position change in one of said members will impart a positioning force change to the other of said members tending to move said other member in the same direction as said one member, a first fluid outlet connected to and continuously bleeding servo fluid from said chamber and positioned adjacent said second movable member to define a first valve therewith and directing a continuous jet of servo fluid from said chamber against said second movable member and hence imparting a first positioning force against said second movable member so that the servo fluid pressure in said chamber and in said first fluid outlet and hence said first positioning force vary with the position of said second movable member relative to said first fluid outlet, and means to compensate for changes in said first positioning force caused by changes in the force creating characteristics of said servo fluid during steady state operation comprising a second fluid outlet connected to and continuously supplied with servo fluid by said supply means and positioned adjacent said second movable member to define a second valve therewith and directing a continuous jet of servo fluid and hence a second positioning force against said second movable member so that the pressure in said second fluid outlet and hence said second positioning force vary with the position of said second movable member relative to said second fluid outlet to counterbalance said first positioning force during steady state operation.

2. Servo positioning means comprising a variable area servo chamber defined by a stationary member and a first movable member, means continually supplying pressurized servo fluid into said chamber, a second movable member, feedback means connecting said movable members, a first fluid outlet connected to and continuously bleeding servo fluid from said chamber and positioned adjacent said second movable member to define a first valve therewith and directing a continuous jet of servo fluid from said chamber against said second movable member and hence imparting a first positioning force against said second movable member so that the servo fluid pressure in said chamber and in said first fluid outlet and hence said first positioning force and servo means vary with the position of said second movable member relative to said first fluid outlet and means to compensate for changes in said first positioning force caused by changes in the force creating characteristics of said servo fluid during steady state operation including supply pressure and density variations comprising a second fluid outlet connected to and continuously supplied with servo fluid by said supply means and positioned adjacent said second movable member to define a second valve therewith and directing a continuous jet of servo fluid and hence a second positioning force against said second movable member and at a position thereon to counterbalance said first positioning force during steady state operation.

3. Actuating means for a movable servo comprising a movable servo member, means to supply actuating servo fluid to said movable servo member to apply an actuating force thereon, a pivotable member, a first fluid outlet positioned to continuously direct a jet of servo actuating fluid and hence a first force against said pivotable member so that the pressure in said first fluid outlet and hence said actuating force vary with the position of said pivotable member relative to said first fluid orifice, feedback means connecting said pivotable member and said movable servo member, force means applying a positioning force to said pivotable member and hence to said movable servo member, and means to compensate for changes in the characteristics of said actuating servo fluid during steady state operation comprising a second fluid outlet positioned to continuously direct a jet of said servo actuating fluid and hence a second force against said movable member in a direction and at a position with respect to said first outlet jet to effect first and second force counterbalance so that said force means provides the sole servo positioning and actuating force.

4. Counterbalance means comprising a movable member pivotable about a pivot point and positioned between a first and a second fixed fluid orifice, a fluid source connected to said orifices and supplying pressurized fluid continuously thereto, said first fluid orifice positioned in close proximity to said movable member and oriented to continuously direct a jet of said fluid and hence a first force including both impulse and pressure forces against said movable member so that the steady state fluid flow orifice forces in said first orifice are responsive to the relative position between said first orifice and said movable member, said second fluid orifice positioned a greater distance form said movable member than said first orifice and oriented to continuously direct a jet of said fluid and hence a second force composed substantially entirely of impulse forces against said movable member, the position and size of said first and second orifices relative to each other and the position of said orifices relative to said movable member being selected so that said first and second forces caused by the continual impinging of said jets against said movable member create cancelling moments against said movable member and so that said moment cancellation continues to occur as the force creating characteristics of said fluid vary during steady state fluid flow operation.

5. Servo positioning means having a movable piston type member cooperating within a stationary cylinder type member to define a servo chamber adapted to receive pressurized servo fluid and establish a servo positioning force against said movable member, a continuous source of pressurized servo fluid supplying servo fluid to said chamber to establish a servo positioning force against said movable member, means to vary said servo positioning force including a pivotable member, feedback means connecting said pivotable member and said movable member, a first fluid outlet connected to said chamber to continuously bleed pressurized servo fluid therefrom and positioned in close proximity to said pivotable member to direct a first continuous jet of servo fluid and hence a first force against said pivotable member so that a combined impulse and pressure force is imparted to said pivotable member by said first jet and so that the pressure of said servo fluid in said chamber and hence said servo positioning force vary with the position of said pivotable member with respect to said first outlet thereby establishing a steady state condition in which said movable and pivotable members are stationary, and means to compensate for changes in the force creating characteristics of said servo fluid arising during steady state operation comprising a second fluid outlet connected to receive a continuous supply of servo fluid from said source and positioned to direct a second continuous jet of said servo fluid against said pivotable member to exert a second force on said pivotable member and located a sufficient distance from said pivotable member that said second force is an impulse force only and directed against the opposite side of said pivotable member from said first force and located to be in counterbalance relationship thereto, and jet flow direction changing means operatively connected to said pivotable member to change the direction of the fluid flow of said second jet so directed against said pivotable member to impart added impulse force to said pivotable member as a result of second jet impingement thereagainst so that said first and second forces continuously counteract the movement provoking force applied to said pivotable member by each at all times during steady state operation even when said force creating characteristics of said fluid vary.

6. Force generating means including a movable member, a first fluid outlet positioned to continuously direct a first jet of force generating fluid and hence a first force against said movable member and positioned in close proximity to said movable member so that a combined impulse and pressure force is imparted to said movable member by said first jet and so that the pressure of said force generating fluid and hence the pressure available for force generation vary with the position of said movable member with respect to said first outlet so that force is generated by moving said movable member with respect to said first outlet, and means to compensate for generated force changes caused by changes in the force creating characteristics of said fluid during steady state operation comprising a second fluid outlet positioned with respect to said movable member to continuously direct a second jet of said force generating fluid against said movable member to exert a second force on said movable member which is an impulse force only and in counterbalance relationship to said first force, and jet flow direction changing means operatively connected to said movable member to change the direction of the fluid flow of said second jet so directed against said movable member to impart added impulse force to said movable member as a result of the impingement of said second jet thereagainst so that said second force is increased to an amount where said first and second forces counteract the movement provoking force applied to said movable member by each at all times during steady state operation even when said force creating characteristics of said fluid vary.

7. Servo actuating means comprising a servo piston, means to supply pressurized actuating fluid to said servo piston, means to regulate servo piston actuating fluid pressure and hence servo piston actuating force and position comprising a movable member and a spring between said movable member and said servo piston and further comprising a first fluid orifice operatively connected to said servo piston and positioned to continuously direct a jet of said actuating fluid against said movable member to create a particular impulse and pressure force thereagainst at steady state flow operation through said first orifice so that actuating fluid pressure and hence servo piston actuating force and position vary as the position of said movable member relative to said first orifice varies and further so that said spring returns said movable member to a steady state position in response to servo piston repositioning as a result of movable member movement, and a second fluid orifice positioned to continuously direct a jet of said actuating fluid against the opposite side of said movable member to create a substantially equal and solely impulse force thereagainst to substantially cancel said impulse and pressure force created by said first orifice, which force cancellation is unaffected by variations in actuating fluid force creating characteristics during steady state fluid flow operation.

8. Counterbalance means comprising a positionable movable member, a fluid supply source, a fluid outlet receiving fluid from said source through a conduit and positioned to continuously direct a jet of fluid and hence a first motion provoking force against said movable member and so that the pressure in said fluid outlet and hence in said conduit vary with the position of said movable member with respect to said outlet, and means to compensate for changes in the force creating characteristics of said fluid during steady state fluid flow operation comprising force generating means actuated by said fluid and positioned to impart a second motion provoking force against said movable member in a direction and at a location to counterbalance said first motion provoking force as said force creating characteristics of said fluid vary during steady state fluid flow operation.

References Cited in the file of this patent

UNITED STATES PATENTS

| 2,053,797 | King | Sept. 8, 1936 |
| 2,540,193 | Eckman | Feb. 6, 1951 |
| 2,618,288 | Catheron | Nov. 18, 1952 |

FOREIGN PATENTS

| 1,007,532 | Germany | May 2, 1957 |